Patented Feb. 5, 1935

1,989,993

UNITED STATES PATENT OFFICE 1,989,993

PHYSIOLOGICALLY ACTIVE EXTRACTS FROM PLACENTA AND PROCESS OF PREPARING THEM

Carl Ludwig Lautenschläger and Willi Ludwig, Frankfort-on-the-Main, Germany, assignors to Winthrop Chemical Company, Inc., New York, N. Y., a corporation of New York No Drawing. Application July 29, 1931, Serial No. 553,897. In Germany August 20, 1930

10 Claims. (Cl. 167—74)

The present invention relates to physiologically active extracts from placenta, more particularly to extracts from placenta containing the substances inducing a precocious sexual maturity in a state practically free from the œstrus-promoting substances, and to a process of preparing them.

It is known that human and animal placenta contain, besides the hormone inducing a precocious sexual maturity, the œstrus hormone. It has also been possible to obtain the extracts, producing the œstrus reaction, by extracting placenta with organic lipoid solvents. Processes, however, for obtaining extracts from placenta inducing a precocious sexual maturity and being free from any substance promoting œstrus have hitherto not been described.

We have found that extracts from human and animal placenta, which induce a precocious sexual maturity and especially accelerate the development of the ovaries of infantile rodents and which are free from œstrus-promoting substances, can be obtained by subjecting the placenta, after treating them according to known methods, with lipoid solvents in order to eliminate the œstrus-promoting substances, and after eliminating ballast substances, if any, to a hydrolyzing process and isolating, according to known methods, the active substances from the hydrolysates so obtained. The hydrolysis may be carried through with a neutral as well as with a feebly acid or a feebly alkaline reaction. The extracts so obtained can be further purified according to known methods.

The process may be carried out, for instance, by extracting placenta according to the methods known for extracting the œstrus-promoting substances,—e. g. by extracting placenta once or several times with acetone—separating the extracts thus obtained from the extracted material by filtration, freeing the latter from the remaining solvent by evaporation and separating the solid matter from the aqueous solution, if any, (due to the presence of the water, contained in the tissue of the placenta if no dried material is used), subjecting the remaining solid matter to a hydrolysis during several days at a moderate temperature, e. g. in a feebly acid, a feebly alkaline or a neutral aqueous solution, separating the solution thus obtained from the solid parts and separating and purifying the active substances which induce a precocious sexual maturity from the solution, by precipitating with alcohol, and dissolving the precipitate in water. The solid parts separated from the solution after the hydrolysis may be subjected to a further hydrolyzation process in the same manner.

The physiologically active extracts thus obtained from placenta induce precocious sexual maturity and can be tested e. g. on infantile rodents, the development of the ovaries of which is accelerated by the said substances. The extracts are practically free from the œstrus-promoting substances; they are furthermore practically free from lipoids and other ballast substances; they are readily soluble in water and insoluble in alcohol of a high percentage.

The following examples illustrate the invention, but they are not intended to limit it thereto:

1. 5 kilograms of placenta are extracted with 10 liters of acetone and the liquid is expressed. The same process is repeated twice, each time with 5 liters of acetone. The combined acetonic extracts can be worked up according to known methods for instance according to U. S. Patent No. 1,314,321, dated August 26, 1919, into œstrus-promoting extracts.

The residue remaining after separating the acetonic extracts from the placenta is freed from the organic solvent and from the water contained in the tissue of the placenta by exposing it to reduced pressure at a low temperature. For hydrolysis 200 grams of the dry residue are stirred with 4 liters of N/100 hydrochloric acid and the mixture is allowed to stand for 3 to 5 days at +4° C. to +10° C. The liquid is then expressed, the solution is precipitated with 5 times its quantity of alcohol and the precipitate so obtained, which contains the active substance, is dissolved in water. The residue left after expressing the first hydrolysate is subjected a second time to a like hydrolysis.

2. The œstrus-promoting substance is eliminated from placenta, as indicated in Example 1, by means of lipoid solvents; 200 grams of the residue, freed from organic solvent and from water according to Example 1, are mixed, while stirring, with 4 liters of N/100 caustic soda solution and caused to stand for several days at 4° C. to 10° C. The mixture is further treated as indicated in Example 1.

3. The œstrus-promoting substance is, as indicated in Example 1, eliminated from placenta and 200 grams of the residue freed from organic solvent and from water according to Example 1 are mixed, while stirring, with 4 liters of distilled water, containing 0.1 per cent. of para-hydroxybenzoic acid methyl ester and allowed to stand for several days at a temperature of from 4° C. to 10° C. The mixture is further treated as indicated in Example 1.

We claim:

1. The process of preparing physiologically active extracts from placenta which comprises subjecting placenta after a treatment with acetone and separation of the acetone to a hydrolyzation process and freeing the solution of the active substances thus obtained from ballast substances by squeezing.

2. The process of preparing physiologically active extracts from placenta which comprises subjecting fresh placenta, after a treatment with acetone and separation of the acetone by filtering off the extract thus obtained and evaporating the residue in a vacuum to dryness, to a hydrolyzation process in an aqueous solution and freeing the solution of the active substances thus obtained from ballast substances by squeezing.

3. The process of preparing physiologically active extracts from placenta which comprises subjecting fresh placenta, after a treatment with acetone, separation of the acetonic extract containing the œstrus-promoting substances by filtration and evaporation of the residue to dryness in a vacuum, to a hydrolyzation process in a N/100 aqueous solution of hydrochloric acid at a temperature of between about +4° C. and +10° C. during several days, separating the solid matter from the solution thus obtained, precipitating from the solution the active substances, which induce a precocious sexual maturity, by addition of alcohol and purifying the aqueous solution obtained by dissolving the precipitate from ballast substances.

4. The process of preparing physiologically active extracts from placenta which comprises subjecting fresh placenta, after a treatment with acetone, separation of the acetonic extract containing the œstrus-promoting substances by filtration and evaporation of the residue to dryness in a vacuum, to a hydrolyzation process in a N/100 aqueous solution of caustic soda at a temperature of between about +4° C. to +10° C. during several days, separating the solid matter from the solution thus obtained, precipitating from the solution the active substances, which induce a precocious sexual maturity, by addition of alcohol and purifying the aqueous solution obtained by dissolving the precipitate from ballast substances.

5. The process of preparing physiologically active extracts from placenta which comprises subjecting fresh placenta, after a treatment with acetone, separation of the acetonic extract containing the œstrus-promoting substances by filtration and evaporation of the residue to dryness in a vacuum, to a hydrolyzation process in a neutral aqueous solution containing about 0.1 per cent. of para-hydroxybenzoic acid methyl ester at a temperature of between about +4° C. and 10° C. during several days, separating the solid matter from the solution thus obtained, precipitating from the solution the active substances, which induce a precocious sexual maturity, by addition of alcohol and purifying the aqueous solution obtained by dissolving the precipitate from ballast substances.

6. Physiologically active extracts prepared from placenta, containing the active substances, inducing precocious sexual maturity, in a state practically free from the œstrus-promoting substances, obtainable by subjecting placenta after a treatment with acetone and separation of the acetone, to a hydrolyzation process and freeing the solution of the active substances thus obtained from ballast substances by squeezing, the said extracts being practically free from lipoids and other ballast substances, being readily soluble in water and insoluble in alcohol of a high percentage.

7. Physiologically active extracts prepared from placenta, containing the active substances, inducing precocious sexual maturity, in a state practically free from the œstrus-promoting substances, obtainable by subjecting fresh placenta after a treatment with acetone and separation of the acetone by filtering off the extract thus obtained and evaporating the residue in a vacuum to dryness, to a hydrolyzation process and freeing the solution of the active substances thus obtained from ballast substances by squeezing, the said extracts being practically free from lipoids and other ballast substances, being readily soluble in water and insoluble in alcohol of a high percentage.

8. Physiologically active extracts prepared from placenta, containing the active substances, inducing precocious sexual maturity, in a state practically free from the œstrus-promoting substances, obtainable by subjecting fresh placenta after a treatment with acetone, separation of the acetonic extract containing the œstrus-promoting substances by filtration and evaporation of the residue to dryness in a vacuum, to a hydrolyzation process in a N/100 aqueous solution of hydrochloric acid at a temperature of between about +4° C. and +10° C. during several days, separating the solid matter from the solution thus obtained, precipitating from the solution the active substances, which induce a precocious sexual maturity, by addition of alcohol and purifying the aqueous solution obtained by dissolving the precipitate from ballast substances, the said extracts being practically free from lipoids and other ballast substances, being readily soluble in water and insoluble in alcohol of a high percentage.

9. Physiologically active extracts prepared from placenta, containing the active substances, inducing a precocious sexual maturity in a state practically free from the œstrus-promoting substances, obtainable by subjecting fresh placenta after a treatment with acetone, separation of the acetonic extract containing the œstrus-promoting substances by fitration and evaporation of the residue to dryness in a vacuum, to a hydrolyzation process in a N/100 aqueous solution of caustic soda at a temperature of between about +4° C. and +10° C. during several days, separating the solid matter from the solution thus obtained, precipitating from the solution the active substances, which induce precocious sexual maturity, by addition of alcohol and purifying the aqueous solution obtained by dissolving the precipitate from ballast substances, the said extracts being practically free from lipoids and other ballast substances, being readily soluble in water and insoluble in alcohol of a high percentage.

10. Physiologically active extracts prepared from placenta, containing the active substances, inducing precocious seual maturity, in a state practically free from the œstrus-promoting substances, obtainable by subjecting fresh placenta after a treatment with acetone, separation of the acetonic extract containing the œstrus-promoting substances by filtration and evaporation of the residue to dryness in a vacuum, to a hydrolyzation process in a neutral aqueous solution containing about 0.1 per cent. of para-hydroxybenzoic acid methyl ester at a temperature of between about $+4°$ C. and $+10°$ C. during several days, separating the solid matter from the solution thus obtained, precipitating from the solution the active substances, which induce a precocious sexul maturity, by adition of alcohol and purifying the aqueous solution obtained by dissolving the precipitate from ballast substances, the said extracts being practically free from lipoids and other ballast substances, being readily soluble in water and insoluble in alcohol of a high percentage.

CARL LUDWIG LAUTENSCHLÄGER.
WILLI LUDWIG.